(12) United States Patent
Higashi et al.

(10) Patent No.: US 7,543,680 B2
(45) Date of Patent: Jun. 9, 2009

(54) ELECTRIC POWER STEERING APPARATUS

(75) Inventors: Kenji Higashi, Nara (JP); Yasuyuki Yoshii, Kyoto (JP); Kazuya Yoshioka, Osaka (JP); Shimon Jimbo, Osaka (JP)

(73) Assignee: JTEKT Corporation, Osaka (JP)

( * ) Notice: Subject to any disclaimer, the term of this patent is extended or adjusted under 35 U.S.C. 154(b) by 71 days.

(21) Appl. No.: 11/802,980

(22) Filed: May 29, 2007

(65) Prior Publication Data

US 2007/0277636 A1 Dec. 6, 2007

(30) Foreign Application Priority Data

May 29, 2006 (JP) ............................. 2006-148431

(51) Int. Cl.
*B62D 1/18* (2006.01)
*F16H 35/00* (2006.01)

(52) U.S. Cl. ..................... 180/444; 280/777; 74/388 PS

(58) Field of Classification Search ................. 180/443, 180/444; 74/492, 493, 388 PS; 280/777
See application file for complete search history.

(56) References Cited

U.S. PATENT DOCUMENTS

| 6,431,601 | B2 * | 8/2002 | Maekawa | 280/777 |
| 6,467,807 | B2 * | 10/2002 | Ikeda et al. | 280/775 |
| 6,990,874 | B2 * | 1/2006 | Murakami et al. | 74/493 |

FOREIGN PATENT DOCUMENTS

JP 2006-103642 4/2006

* cited by examiner

*Primary Examiner*—Tony H. Winner
(74) *Attorney, Agent, or Firm*—Rabin & Berdo, PC

(57) ABSTRACT

An electric power steering apparatus includes a steering assisting electric motor having a motor housing for accommodating an annular rotor and an annular stator. The rotor and the stator are disposed coaxially with a steering shaft. The motor housing is supported by a support member mounted to a vehicle body member. A shock applied to a steering member when the motor vehicle crashes is absorbed by the relative movement between the motor housing and the support member.

5 Claims, 3 Drawing Sheets

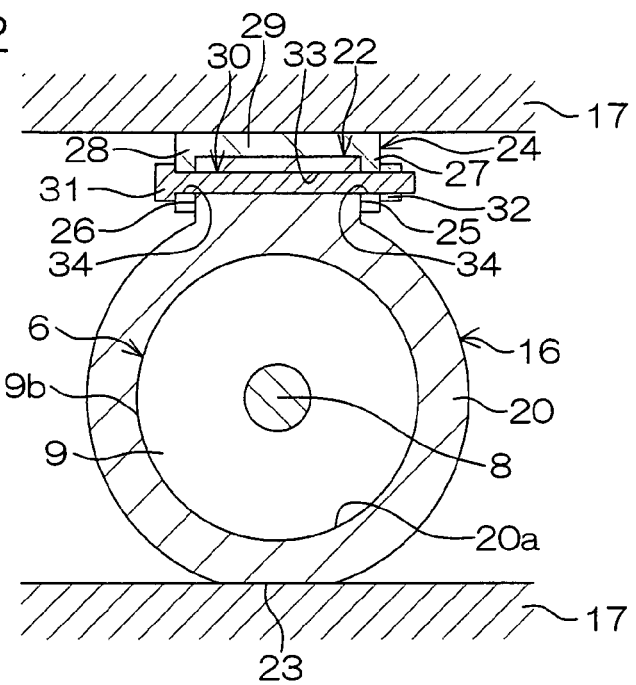
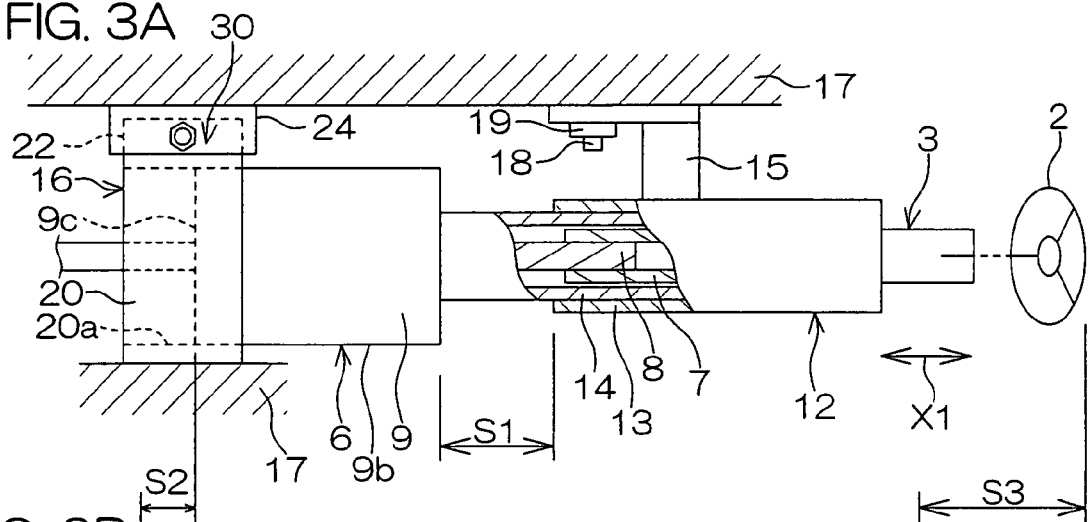
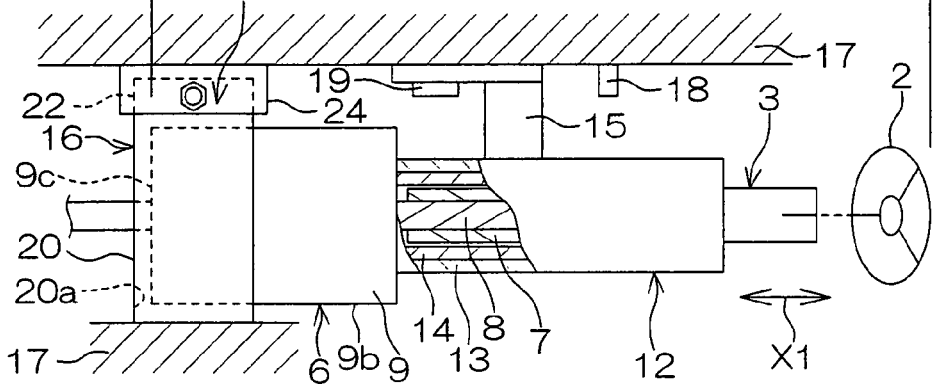

ELECTRIC POWER STEERING APPARATUS

BACKGROUND OF THE INVENTION

1. Field of the Invention

The present invention relates to an electric power steering apparatus for generating a steering assist force by an electric motor.

2. Description of Related Arts

An electric power steering apparatus equipped with an electric motor having a rotational shaft provided coaxially with a steering shaft coupled to a steering member has been proposed as an electric power steering apparatus for a motor vehicle (see Document 1: Japanese Unexamined Patent Publication No. 2006-103642, for example).

The electric power steering apparatus is normally equipped with a shock absorbing mechanism for contracting a steering shaft and a cylindrical jacket for rotatably supporting the steering shaft in the axial direction, thereby absorbing a shock applied from a driver to the steering member when a motor vehicle crashes.

When the shock absorbing mechanism is provided to the electric power steering apparatus described in Document 1, the electric motor occupies a part of the space in the axial direction of the steering shaft and the jacket. Accordingly, it is impossible to sufficiently secure a contraction stroke of the shock absorbing mechanism (corresponding to a shock absorbing stroke).

An object of the present invention is to provide an electric power steering apparatus which can sufficiently secure a shock absorbing stroke amount.

SUMMARY OF THE INVENTION

In order to attain the above object, according to a preferred mode of the present invention, there is provided an electric power steering apparatus having a steering shaft coupled to a steering member. The electric power steering apparatus includes a steering assisting electric motor having an annular rotor and annular stator that are disposed coaxially with the steering shaft, and a motor housing for accommodating the rotor and the stator, and a support member that is mounted to a vehicle body member and supports the motor housing. When a motor vehicle crashes, a shock applied to the steering member is absorbed by the relative movement between the motor housing and the support member.

According to the present invention, when the motor vehicle crashes, the support member mounted to the vehicle body member and the motor housing are relatively moved. Accordingly, the stroke amount of the steering member for absorbing the shock can be sufficiently secured. As a result, the shock can be reliably absorbed.

BRIEF DESCRIPTION OF THE DRAWINGS

FIG. 2 is a schematic sectional view taken along line II-II of FIG. 1;

FIG. 3A and FIG. 3B are views showing the stroke amount of a steering member when a shock is absorbed, wherein FIG. 3A shows a state before a steering member 2 is stroked, and FIG. 3B shows a state after the steering member 2 is stroked.

DETAILED DESCRIPTION OF THE PREFERRED EMBODIMENTS

An embodiment according to the present invention will be described below with reference to the accompanying drawings.

Figure 1:
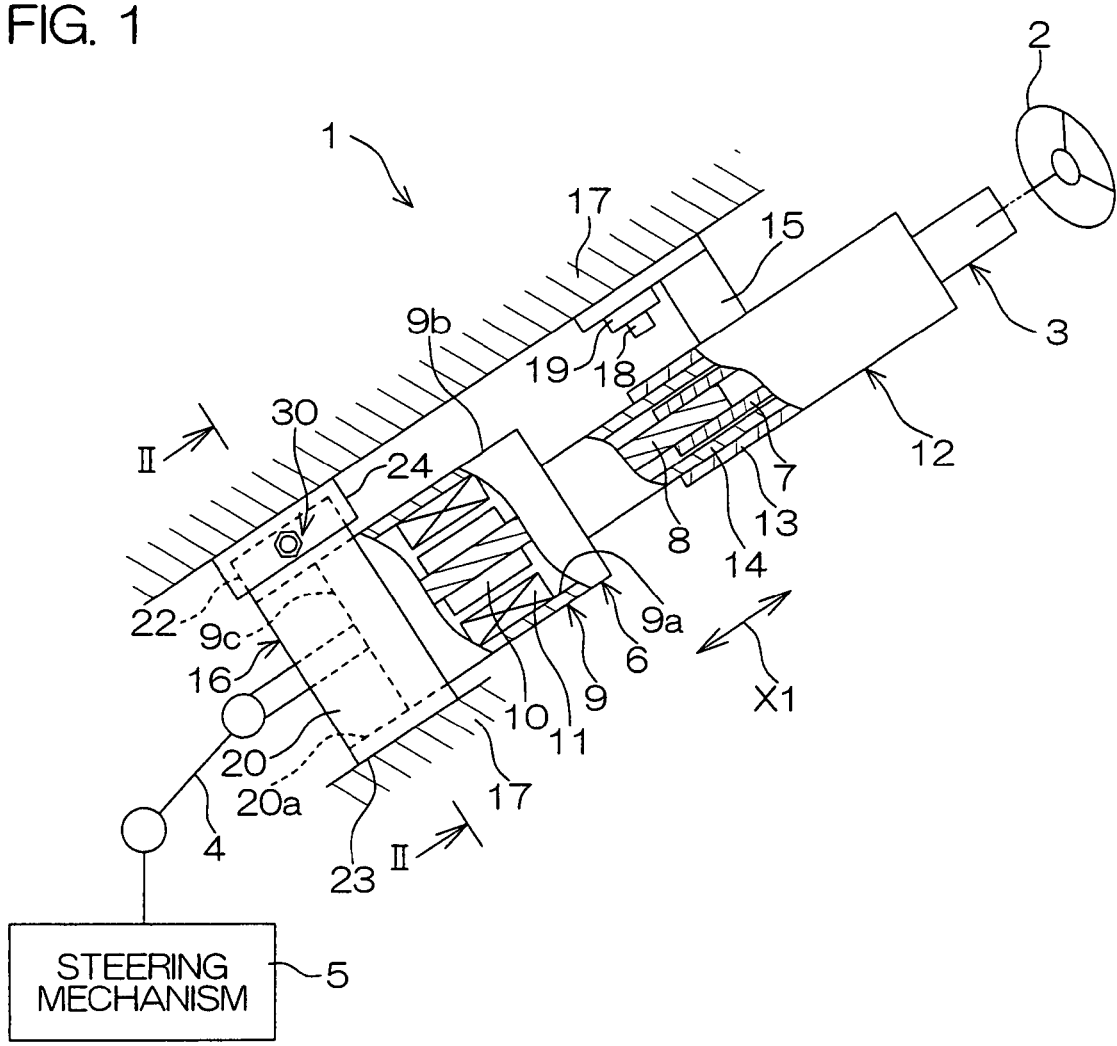
FIG. 1 is a schematic view showing the construction of an electric power steering apparatus according to an embodiment of the present invention.

FIG. 1 is a schematic view showing the construction of an electric power steering apparatus 1 according to an embodiment of the present invention, and a part thereof is sectionally shown.

Referring to FIG. 1, the electric power steering apparatus 1 includes a steering member 2 such as a steering wheel, a steering shaft 3 which is coupled to the steering member 2 at one end thereof, a steering mechanism 5 such as a rack and pinion mechanism which is coupled to the other end of the steering shaft 3 via an intermediate shaft 4, and a steering assisting electric motor 6.

The steering shaft 3 is obliquely disposed in the vertical direction so that the end portion thereof at the steering member 2 side is located on the upper side. Furthermore, the steering shaft 3 is divided into an upper shaft 7 coupled to the steering member 2 and a lower shaft 8 coupled to the steering mechanism 5 via the intermediate shaft 4. The upper shaft 7 is designed in a cylindrical shape, and a part of the lower shaft 8 is fitted inside the upper shaft 7. The upper shaft 7 is movable in an axial direction X1 of the steering shaft 3 with respect to the lower shaft 8 and rotatable together with the lower shaft 8.

The electric motor 6 used in the present embodiment is a so-called direct drive brushless motor, and the output of the electric motor 6 can be directly transmitted to the steering shaft 3. The electric motor 6 is coaxially coupled to the steering shaft 3.

The electric motor 6 has a cylindrical motor housing 9, an annular rotor 10 coupled to the lower shaft 8, and an annular stator 11 coupled to an inner periphery 9a of the motor housing 9. The rotor 10 is coaxially coupled to the lower shaft 8. The stator 11 surrounds the rotor 10, and also faces the rotor 10 so as to be spaced from the rotor 10 at a predetermined interval. The rotor 10 and the stator 11 are accommodated in the motor housing 9.

A cylindrical jacket 12 through which the steering shaft 3 is inserted is fixed to an end portion of the motor housing 9 which is located on the steering member 2 side. The jacket 12 includes a cylindrical upper jacket 13 and a cylindrical lower jacket 14 which are fitted to each other. One end portion of the lower jacket 14 is fixed to the motor housing 9, and a part of the lower jacket 14 which includes the other end portion thereof is fitted inside the upper jacket 13.

The upper jacket 13 is made movable in the axial direction X1 with respect to the lower jacket 14. Specifically, a plurality of caulking projections (not shown) are formed on the inner periphery of the upper jacket 13, and these caulking projections are fixed to the outer periphery of the lower jacket 14 by caulking. Accordingly, when a second crash described later occurs, both the jackets 13, 14 are relatively moved in the axial direction X1, and the shock of the second crash is absorbed along with this relative movement.

The steering shaft 3 is rotatably supported by the motor housing 9, the upper jacket 13 and the lower jacket 14 via a plurality of bearings (not shown). The upper shaft 7 is supported by the upper jacket 13 so as to be movable together with the upper jacket 13 in the axial direction X1. Accordingly, the steering member 2 and the upper shaft 7 are made movable in the axial direction X1 together with the upper jacket 13 relative to the lower jacket 14.

The jacket 12 and the motor housing 9 constitute a steering column for rotatably supporting the steering shaft 3.

Next, the fixing state of the electric power steering apparatus 1 to the vehicle body 17 will be described.

The electric power steering apparatus 1 is fixed to a vehicle body 17 via a mounting bracket 15 mounted to the upper jacket 13 and a support member 16 for supporting the motor housing 9.

The mounting bracket 15 is coupled to the vehicle body 17, for example, via a bolt 18 and a coupling member 19 made of synthetic resin. The coupling member 19 is broken when a load exceeding a predetermined value is applied thereto, thereby releasing the coupling between the mounting bracket 15 and the vehicle body 17. Under the state where the coupling between the mounting bracket 15 and the vehicle body 17 is released, the upper jacket 13 is movable in the axial direction X1 relative to the vehicle body 17 and the lower jacket 14.

Referring to FIG. 2, the support member 16 has a cylindrical portion 20 into which a part of the motor housing 9 in the axial direction is inserted. The inner periphery 20a of the cylindrical portion 20 is designed so as to generally correspond to an outer periphery 9b of the motor housing 9. A part of the motor housing 9 in the axial direction is fitted to the inner periphery 20a of the cylindrical portion 20 by press-fitting, whereby the motor housing 9 is fixed to the support member 16 under a predetermined fixing strength.

That is, when a load exceeding a predetermined value is applied to the motor housing 9 in the axial direction X1, the motor housing 9 is moved in the axial direction X1 relative to the support member 16.

Furthermore, in the axial direction X1, an end portion 9c on the lower side of the motor housing 9 is designed so as not to project below the support member 16.

The support member 16 has a projecting portion 22 projecting from an outer periphery 20b of the cylindrical portion 20, and a flat portion 23 provided on the outer periphery 20b of the cylindrical portion 20. The projecting portion 22 is coupled to a vehicle body member 24 fixed to the vehicle body 17, and the flat portion 23 is fitted to the corresponding flat portion of the vehicle body 17.

Specifically, the projecting portion 22 has a pair of flat surfaces 25, 26 forming a width across flat. The vehicle body member 24 has a pair of side plates 27 and 28 parallelly facing each other, and a coupling plate 29 coupling the pair of side plates 27, 28. The pair of side plates 27, 28 face the corresponding flat faces 25, 26, respectively. The projecting portion 22 and the vehicle body member 24 are coupled to each other via a coupling mechanism 30.

In the present embodiment, a screw 31 and a nut 32 are used as the coupling mechanism 30. Specifically, the screw 31 which is inserted through an insertion hole 33 of the projecting portion 22 and insertion holes 34 of the pair of side plates 27 and 28 is screwed in the nut 32 to clamp the projecting portion 22 between the pair of side plates 27, 28, whereby the projecting portion 22 and the vehicle body member 24 are coupled to each other.

That is, in the present embodiment, the projecting portion 22 and the vehicle body member 24 are coupled to each other, and the flat portion 23 and the corresponding flat portion of the vehicle body 17 are fitted to each other, whereby the support member 16 is fixed to the vehicle body 17.

FIGS. 3A and 3B are views to describe the stroke amount of the steering member 2 when a shock is absorbed, wherein FIG. 3A shows a state before the steering member 2 strokes, and FIG. 3B shows a state after the steering member 2 strokes.

Referring to FIG. 3A, under a normal state where the motor vehicle does not crash, the steering member 2 is held at a substantially fixed position in the axial direction X1 and the stroke amount thereof is equal to zero.

When the motor vehicle crashes (primary crash) and thus the driver crashes against the steering member 2 (secondary crash) from the above state, a shock is applied from the driver to the steering member 2. Then, the shock applied to the steering member 2 is transmitted to the mounting bracket 15 and the motor housing 9 via the steering shaft 3 and the upper jacket 13, etc.

When the shock applied to the mounting bracket 15 exceeds a predetermined value, the upper jacket 13 is movable relative to the vehicle body 17 and the lower jacket 14. Accordingly, as shown in FIG. 3B, the upper jacket 13 moves to the lower side in the axial direction X1 (to the left side in FIG. 3B) together with the steering member 2 and the upper shaft 7, and the shock applied to the steering member 2 is absorbed in connection with the relative movement of both the jackets 13, 14.

The movement of the upper jacket 13 to the lower side in the axial direction X1 relative to the lower jacket 14 is made possible by a stroke amount S1 by which the end portion on the lower side of the upper jacket 13 shown in FIG. 3A abuts against the motor housing 9.

Furthermore, when the shock applied to the motor housing 9 exceeds a predetermined value, as shown in FIG. 3B, the motor housing 9 moves to the lower side in the axial direction X1 relative to the support member 16 together with the both jackets 13, 14, the upper shaft 7 and the steering member 2. The shock applied to the steering member 2 is absorbed by the relative movement in the axial direction X1 between the motor housing 9 and the support member 16.

The movement of the motor housing 9 to the lower side in the axial direction X1 relative to the support member 16 is made possible by a stroke amount S2 in a range where the end portion on the lower side of the motor housing 9 does not project below the support member 16. Accordingly, the motor housing 9 can be prevented from interfering with other members, etc., disposed in the vicinity of the intermediate shaft 4 and the electric power steering apparatus 1.

In the present embodiment, a shock absorption stroke amount S3 of the steering member 2 at the second crash (corresponding to the total stroke amount) corresponds to the amount obtained by adding the relative movement amount of the motor housing 9 and the support member 16 (corresponding to the stroke amount S2) to the relative movement amount of the upper jacket 13 and the lower jacket 14 (corresponding to the stroke amount S1). That is, S3=S1+S2.

Accordingly, the sufficiently large shock absorption stroke amount S3 for absorbing the shock applied to the driver can be secured. Furthermore, the shock applied to the steering member 2 can be more reliably absorbed.

The relative movement between the upper jacket 13 and the lower jacket 14 and the relative movement between the motor housing 9 and the support member 16 are preferably set so that one relative movement is started while the other relative movement is being carried out, or both the relative movements are started substantially at the same time. In this case, with respect to the stroke of the steering member 2 at the second crash, the shock absorption load can be made substantially fixed.

Furthermore, the method for fixing the support member 16 to the vehicle body 17 is not limited to the above method, and other methods such as welding, etc., may be adopted.

Figure 4:
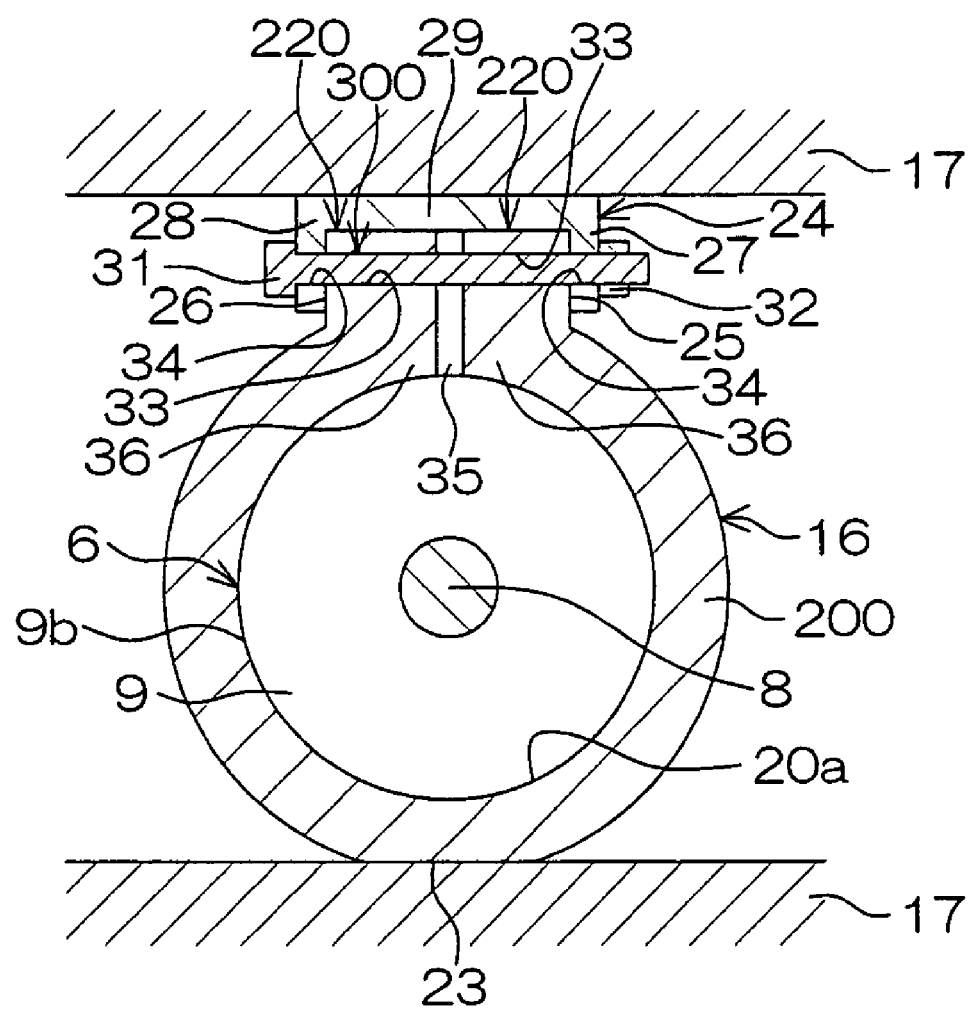
FIG. 4 is a schematic sectional view showing an electric power steering apparatus according to another embodiment of the present invention.

In addition, as shown in FIG. 4, a cylindrical portion 200 of the support member 16 may be designed to have ends in the peripheral direction thereof. Specifically, the support member 16 has a slit 35 extending in the axial direction of the cylindrical portion 200, and a pair of portions 36 which face each other across the slit 35. Apart of the pair of portions 36 constitutes a pair of projections 220 projecting to the outside from the cylindrical portion 220.

An interval adjusting mechanism 300 for adjusting the interval between the pair of portions 36 is provided as a clamping force adjusting mechanism for adjusting the clamping force applied to the motor housing 9 by the cylindrical portion 200. The interval adjusting mechanism 300 includes a screw 31 inserted through the insertion holes 33 of the pair of projecting portions 220 and the insertion holes 34 of the pair of side plates 27, 28 of the vehicle body member 24, and a nut 32.

By adjusting the screwed position of the nut 32 to the screw 31, the distance between the pair of side plates 27, 28 is adjusted between the head portion of the screw 31 and the nut 32, so that the interval between the pair of portions 36 is adjusted. The pair of side plates 27, 28 function as a pair of clamp plates for clamping the pair of portions 36.

The interval adjusting mechanism 300 as the clamping force adjusting mechanism also functions as a coupling mechanism for coupling the projection portion 220 of the support member 16 to the vehicle body member 24.

In this case, the interval between the pair of portions 36 is adjusted by the interval adjusting mechanism 300 to reduce or enlarge the diameter of the cylindrical portion 200 of the support member 16. Accordingly, the clamping force applied to the motor housing 9 by the support member 16 can be adjusted, and the fixing strength between the support member 16 and the motor housing 9 can be changed. As a result, when the motor vehicle crashes, the shock absorption load obtained by the relative movement between the cylindrical portion 200 and the motor housing 9 can be easily adjusted.

Although the embodiments of the present invention have been described in detail, changes, modifications and equivalents thereof will be easily conceived by those skilled in the art who understand the present invention. Accordingly, the present invention should be construed within the scope of the claims and the equivalents thereof.

This application corresponds to Japanese Patent Application No. 2006-148431 filed with the Japanese Patent Office on May 29, 2006, and all the disclosure of this application is incorporated herein by reference.

What is claimed is:

1. An electric power steering apparatus, comprising:
a steering shaft coupled to a steering member;
a steering assisting electric motor having an annular rotor and an annular stator that are disposed coaxially with the steering shaft, and a motor housing in which the rotor and the stator are accommodated;
a cylindrical jacket for rotatably supporting the steering shaft, the jacket including an upper jacket and a lower jacket that are fitted to each other; and
a support member that is mounted to a vehicle body member and supports the motor housing, wherein a shock applied to the steering member when a motor vehicle crashes is absorbed by both relative movement between the upper jacket and the lower jacket and relative movement between the motor housing and the support member.

2. The electric power steering apparatus according to claim 1, wherein the support member includes a cylindrical portion that is fitted to an outer periphery of the motor housing.

3. The electric power steering apparatus according to claim 2, further comprising a clamping force adjusting mechanism for adjusting a clamping force applied to the motor housing by the cylindrical portion.

4. The electric power steering apparatus according to claim 3, wherein the support member includes a slit extending in an axial direction of the cylindrical portion and a pair of portions facing each other across the slit, and the clamping force adjusting mechanism includes an interval adjusting mechanism for adjusting the interval between the pair of portions of the support member.

5. The electric power steering apparatus according to claim 4, wherein the vehicle body member includes a pair of side plates, the pair of portions of the support member are interposed between the pair of side plates, and the interval adjusting mechanism includes a screw that is inserted through insertion holes of the pair of side plates of the vehicle body member and insertion holes of the pair of portions of the support member, for coupling the support member to the vehicle body member.

* * * * *